US012621343B2

(12) United States Patent
Zhong et al.

(10) Patent No.: US 12,621,343 B2
(45) Date of Patent: May 5, 2026

(54) ENHANCED INTERNAL HOST DETECTION PROTOCOL

(71) Applicant: Palo Alto Networks, Inc., Santa Clara, CA (US)

(72) Inventors: Jiyuan Zhong, Gilroy, CA (US); Remy Ouaini, Dubai (AE); Tripti Agarwal, Fremont, CA (US); Pratiksha Jain, Santa Clara, CA (US); Jose Carlos Sagrero Dominguez, Atlanta, GA (US); Hao Long, Campbell, CA (US); Tao Lin, San Jose, CA (US); Damodar Jayram Banodkar, San Carlos, CA (US); Vinod Kumar Balasubramanyam, Pleasanton, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 221 days.

(21) Appl. No.: 18/395,305

(22) Filed: Dec. 22, 2023

(65) Prior Publication Data

US 2025/0211612 A1 Jun. 26, 2025

(51) Int. Cl.
*H04L 29/06* (2006.01)
*H04L 9/40* (2022.01)

(52) U.S. Cl.
CPC ................................ *H04L 63/1466* (2013.01)

(58) Field of Classification Search
CPC ..... G06F 21/755; G06F 21/81; H04L 63/1466
See application file for complete search history.

(56) References Cited

U.S. PATENT DOCUMENTS

2017/0310709 A1* 10/2017 Foxhoven ........... H04L 61/4511
2022/0158975 A1* 5/2022 Brecl .................. H04L 61/4511

OTHER PUBLICATIONS

Al-Qudah et al., Anycast-Aware Transport for Content Delivery Networks, WWW 2009, Apr. 20-24, 2009, Madrid, Spain.
De Vries et al., Global-Scale Anycast Network Management with Verfploeter, 2020 IEEE.
Weber et al., A Survey of Anycast in IPV6 Networks, IPV6: Basis for the Next Generation Networks, IEEE Communications Magazine, Jan. 2004, pp. 127-132.

* cited by examiner

*Primary Examiner* — Wasika Nipa
(74) *Attorney, Agent, or Firm* — Van Pelt, Yi & James LLP

(57) ABSTRACT

Techniques for an enhanced internal host detection protocol are disclosed. In some embodiments, a system, a process, and/or a computer program product for an enhanced internal host detection protocol includes sending a response to a get configuration query from a portal for a cloud security service to an endpoint agent; routing a DNS reverse lookup query to a predetermined IP address associated with a DNS proxy associated with the cloud security service; sending a response to the DNS reverse lookup query from the DNS proxy associated with the cloud security service; and verifying that the response to the DNS reverse lookup query is not spoofed based on a match with the response to the get configuration query.

14 Claims, 9 Drawing Sheets

300

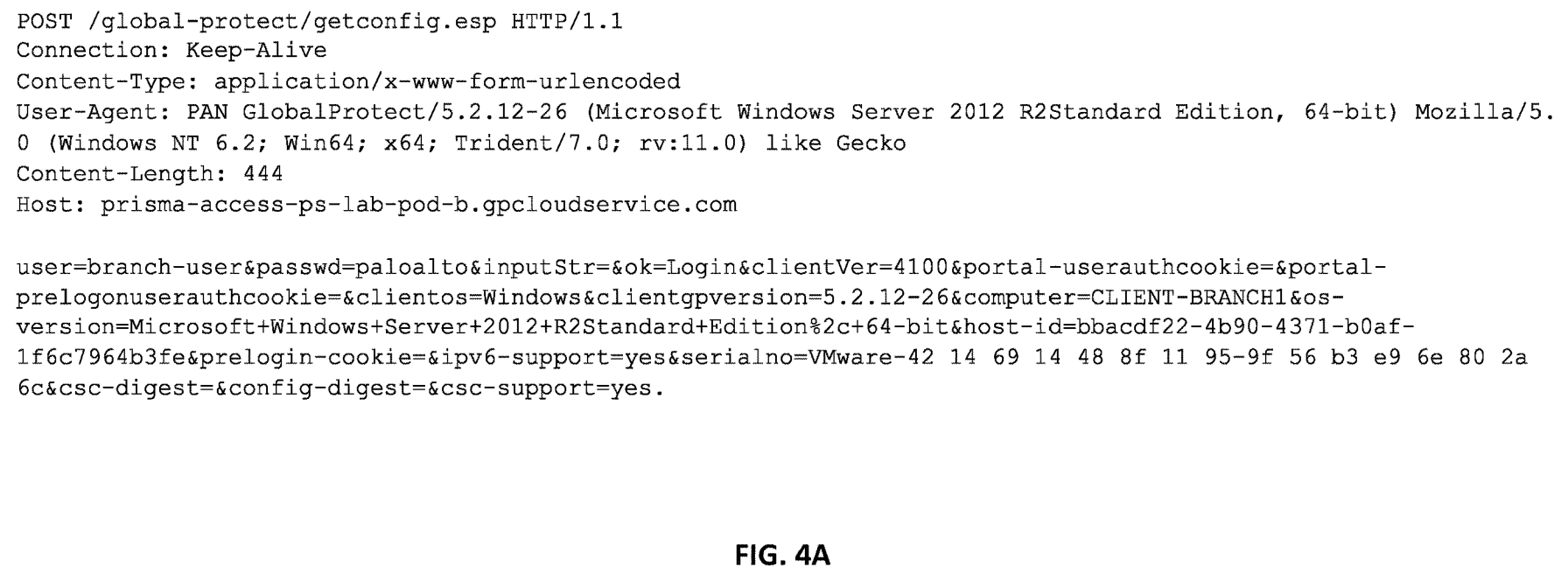

```
POST /global-protect/getconfig.esp HTTP/1.1
Connection: Keep-Alive
Content-Type: application/x-www-form-urlencoded
User-Agent: PAN GlobalProtect/5.2.12-26 (Microsoft Windows Server 2012 R2Standard Edition, 64-bit) Mozilla/5.
0 (Windows NT 6.2; Win64; x64; Trident/7.0; rv:11.0) like Gecko
Content-Length: 444
Host: prisma-access-ps-lab-pod-b.gpcloudservice.com user=branch-user&passwd=paloalto&inputStr=&ok=Login&clientVer=4100&portal-userauthcookie=&portal-
prelogonuserauthcookie=&clientos=Windows&clientgpversion=5.2.12-26&computer=CLIENT-BRANCH1&os-
version=Microsoft+Windows+Server+2012+R2Standard+Edition%2c+64-bit&host-id=bbacdf22-4b90-4371-b0af-
1f6c7964b3fe&prelogin-cookie=&ipv6-support=yes&serialno=VMware-42 14 69 14 48 8f 11 95-9f 56 b3 e9 6e 80 2a
6c&csc-digest=&config-digest=&csc-support=yes.
```

FIG. 4A

```
<internal-host-detection>
   <ip-address>1.2.3.4</ip-address>
   <host>you-are.panw.local</host>
   <ipv6-address/>
   <ipv6-host/>
 </internal-host-detection>

<gateways>
   <internal>
     <list>
       <entry name="julian-igwl">
         <description>julian-igwl</description>
         <fqdn>julian-igwl.panw.local</fqdn>
         <source-ip>
           <member>172.16.3.0/24</member>
         </source-ip>
       </entry>
       <entry name="julian2-igw2">
         <description>julian2-igw2</description>
          <ip>
            <ipv4>10.2.3.4</ipv4>
            <ipv6/>
          </ip>
       </entry>
     </list>
   </internal>
```

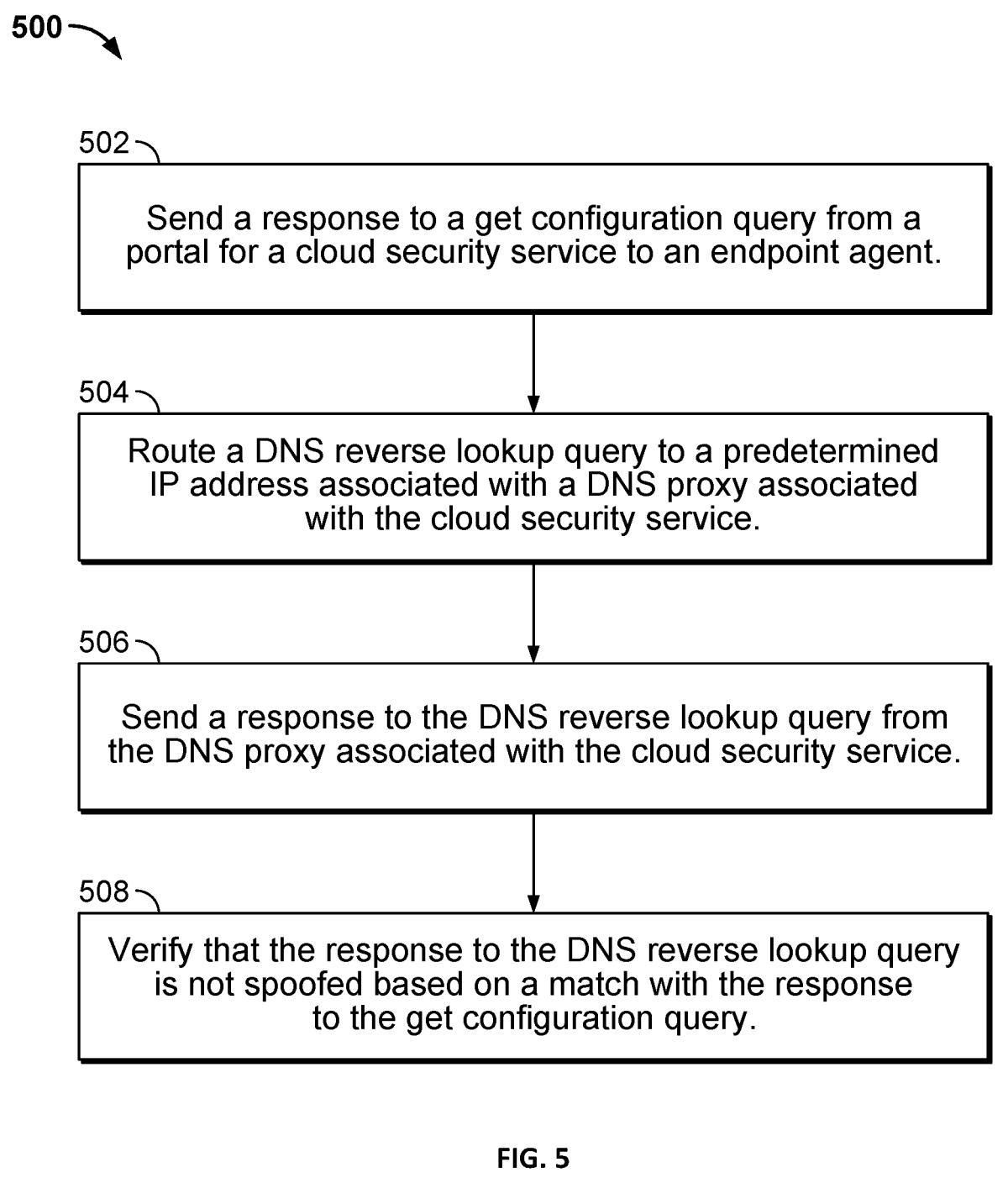

Send a response to a get configuration query from a portal for a cloud security service to an endpoint agent.

504

Route a DNS reverse lookup query to a predetermined IP address associated with a DNS proxy associated with the cloud security service.

506

Send a response to the DNS reverse lookup query from the DNS proxy associated with the cloud security service.

508

Verify that the response to the DNS reverse lookup query is not spoofed based on a match with the response to the get configuration query.

FIG. 5

ENHANCED INTERNAL HOST DETECTION PROTOCOL

BACKGROUND OF THE INVENTION

Nefarious individuals attempt to compromise computer systems in a variety of ways. As one example, such individuals may embed or otherwise include malicious software ("malware") in email attachments and transmit or cause the malware to be transmitted to unsuspecting users. When executed, the malware compromises the victim's computer. Some types of malware will instruct a compromised computer to communicate with a remote host. For example, malware can turn a compromised computer into a "bot" in a "botnet," receiving instructions from and/or reporting data to a command and control (C&C) server under the control of the nefarious individual. One approach to mitigating the damage caused by malware is for a security company (or other appropriate entity) to attempt to identify malware and prevent it from reaching/executing on end user computers. Another approach is to try to prevent compromised computers from communicating with the C&C server. Unfortunately, malware authors are using increasingly sophisticated techniques to obfuscate the workings of their software. As one example, some types of malware use Domain Name System (DNS) queries to exfiltrate data. Accordingly, there exists an ongoing need for improved techniques to detect malware and prevent its harm. Techniques for detecting malware may be performed locally by a firewall or via a cloud service.

BRIEF DESCRIPTION OF THE DRAWINGS

Various embodiments of the invention are disclosed in the following detailed description and the accompanying drawings.

FIG. 4A illustrates an example of a getconfig request from an endpoint agent in accordance with some embodiments.

FIG. 4B illustrates a typical response from the cloud security service portal to the getconfig request sent from the endpoint agent in accordance with some embodiments.

FIG. 5 is a flow diagram of a process for an enhanced internal host detection protocol in accordance with some embodiments.

DETAILED DESCRIPTION

Figure 1:
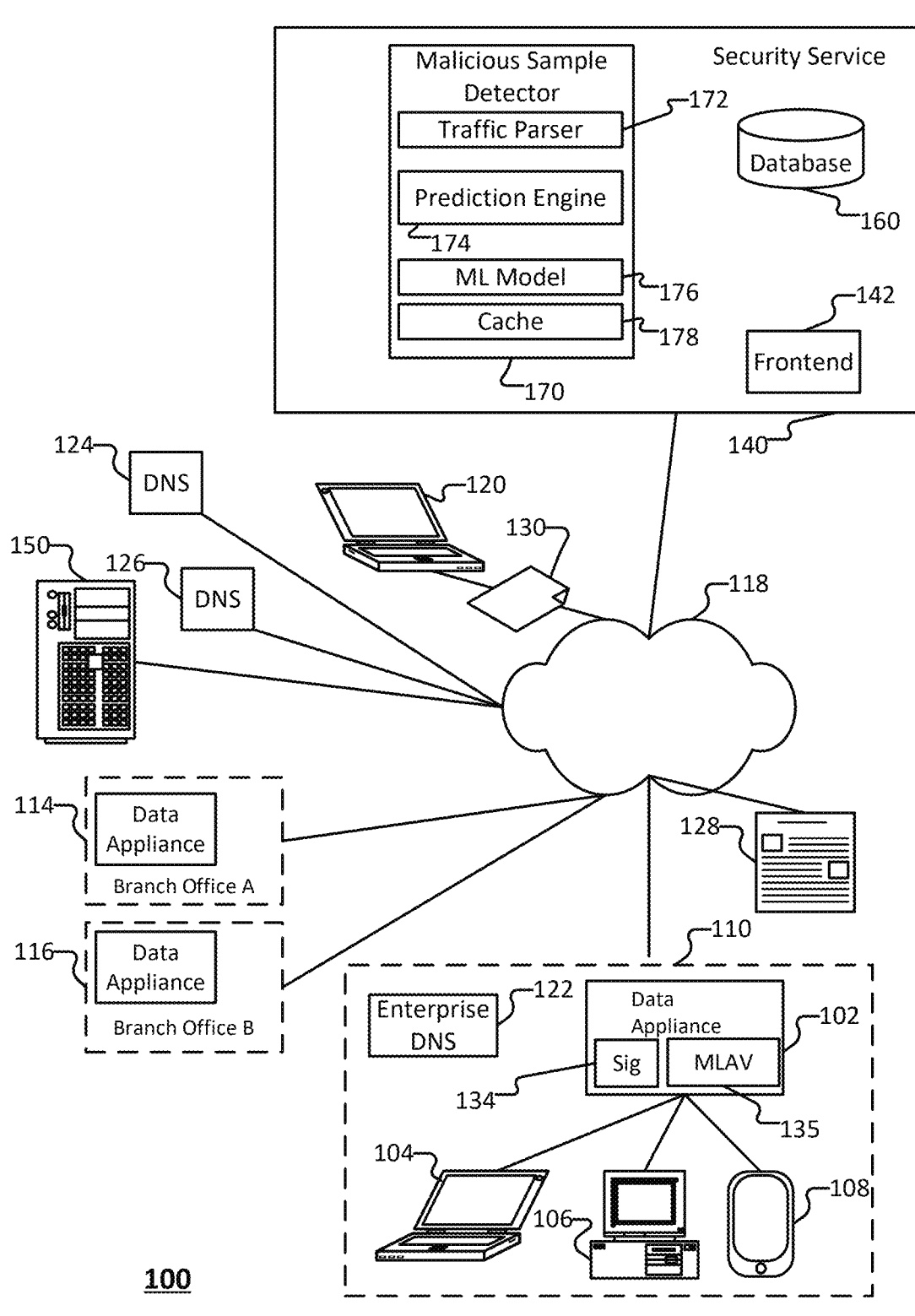
FIG. 1 is a block diagram of an environment in which a malicious traffic is detected or suspected in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Advanced or Next Generation Firewalls

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices, and in some implementations, certain operations can be implemented in special purpose hardware, such as an ASIC or FPGA).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein). A firewall can also filter local network (e.g., intranet) traffic by similarly applying a set of rules or policies.

Security devices (e.g., security appliances, security gateways, security services, and/or other security devices) can perform various security operations (e.g., firewall, anti-malware, intrusion prevention/detection, proxy, and/or other security functions), networking functions (e.g., routing, Quality of Service (QoS), workload balancing of network related resources, and/or other networking functions), and/or other security and/or networking related operations. For example, routing can be performed based on source information (e.g., IP address and port), destination information (e.g., IP address and port), and protocol information (e.g., layer-3 IP-based routing).

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using Hyper-Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques.

For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls).

For example, Palo Alto Networks' next generation firewalls enable enterprises to identify and control applications, users, and content—not just ports, IP addresses, and packets—using various identification technologies, such as the following: App-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls.

Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' firewalls, which support various commercial virtualized environments, including, for example, VMware® ESXi™ and NSX™, Citrix® Netscaler SDX™ KVM/OpenStack (Centos/RHEL, Ubuntu®), and Amazon Web Services (AWS)).

For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

Technical Challenges for Authentication for Cloud Security Services

Cloud security services, such as Prisma Access™ (PA), a commercially available cloud security service from Palo Alto Networks, Inc, headquartered in Santa Clara, CA that provides a security solution in the cloud that, for example, protects a hybrid workforce and protects all application traffic, generally need effective and efficient solutions for authenticating users (e.g., external/mobile/remote users). There are several potential security and other technical challenges with such authentication of users to cloud security services.

For example, an Internal Gateway (IGW) can be provided on Remote Network (RN) security platforms (e.g., network gateway firewalls (NGFWs) can be provided at each branch office or other locations associated with an enterprise that is a customer of the cloud security service, such as Prisma Access). In this approach, an endpoint agent executing on a user's device (e.g., a GlobalProtect™ (GP) client (GPC) is an example of a commercially available agent provided by Palo Alto Networks, Inc, headquartered in Santa Clara, CA) from the network behind each IGW authenticates with them to pass security enforcement.

However, a customer can have hundreds of RNs, in which the IGWs (i.e., on each RN) are typically presented in a list. The endpoint agent logs into IGWs based on their configured criteria for authentication. As such, it can be difficult to manage such a large number of IGWs for enterprise customers of the cloud security service.

Also, there are various limitations of such approaches using the above-described internal host detection for this existing IGW approach for authentication of users to cloud security services. For example, customers are required to host an internal DNS server with PTR record support (e.g., to support DNS reverse lookup for such internal host detection). Also, customers need to configure the security platform (e.g., NFGW) as IGWs (e.g., and customers would need to either authenticate with all the IGWs (if source IP is not configured), or the customer Information Technology (IT) admins would be required to configure a set of subnets on each IGW configuration to avoid too many logins on each endpoint agent), and as such, it is not cloud native (e.g., and many customers desire a cloud native solution for such authentication of users to the cloud security service).

Thus, improved solutions for providing authentication of users to cloud security services are needed.
Overview of an Enhanced Internal Host Detection Protocol Accordingly, new and improved techniques for an enhanced internal host detection protocol are disclosed.

For example, an enhanced internal host detection protocol is disclosed that facilitates an improved solution for providing authentication of users to cloud security services, such as further described below.

In some embodiments, a system, a process, and/or a computer program product for an enhanced internal host detection protocol includes sending a response to a get configuration query from a portal for a cloud security service to an endpoint agent; routing a DNS reverse lookup query to a predetermined IP address associated with a DNS proxy associated with the cloud security service; sending a response to the DNS reverse lookup query from the DNS proxy associated with the cloud security service; and verifying that the response to the DNS reverse lookup query is not spoofed based on a match with the response to the get configuration query.

In an example implementation, the disclosed techniques for providing an enhanced internal host detection protocol utilizes a cloud security service hosted internal host detection and IGW (e.g., hosted on the cloud security service's RNs), such as further described below with respect to various embodiments. As such, the customer can choose to use the DNS Proxies provided on the cloud security service's Remote Networks (RNs). As a result, the customer does not have to be responsible for deploying their own internal DNS servers as described above in the prior approach for user authentication to cloud security services. The IGW hosted on the cloud security service's RNs thereby eliminates the requirement that customers deploy NGFW IGWs as described above in the prior approach for user authentication to cloud security services. Accordingly, this example implementation reduces costs and technical challenges for the customer deployment and support for user authentication to cloud security services. Moreover, such reduces the customer's Information Technology (IT) administrator (admin) efforts of having to configure and maintain such IGWs and an internal DNS service on their enterprise network environments.

As such, the disclosed techniques for an enhanced internal host detection protocol can facilitate a native cloud solution for user authentication to cloud security services.

Also, the disclosed techniques for an enhanced internal host detection protocol can facilitate on premises and cloud-based hybrid mode for user authentication to cloud security services (e.g., to allow customers to evaluate and test this new solution prior to removing the on premises IGWs).

In addition, the disclosed techniques for an enhanced internal host detection protocol can facilitate a simplified solution for user ID redistribution (e.g., reducing the user ID redistribution traffic).

These and other embodiments for an enhanced internal host detection protocol will now be further described below.
System Embodiments for an Enhanced Internal Host Detection Protocol FIG. 1 is a block diagram of an environment in which a malicious traffic is detected or suspected in accordance with some embodiments. In the example shown, client devices 104-108 are a laptop computer, a desktop computer, and a tablet (respectively) present in an enterprise network 110 (belonging to the "Acme Company"). Data appliance 102 is configured to enforce policies (e.g., a security policy) regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, inputs to application portals (e.g., web interfaces), files exchanged through instant messaging programs, and/or other file transfers. In some embodiments, data appliance 102 is also configured to enforce policies with respect to traffic that stays within (or from coming into) enterprise network 110.

In the example shown, data appliance 102 is a security platform, also referred to herein as an inline security entity. Data appliance 102 performs low-latency processing/analysis of incoming data (e.g., traffic data) and determines whether to offload any processing of the incoming data to a cloud system, such as security service 140.

Techniques described herein can be used in conjunction with a variety of platforms (e.g., desktops, mobile devices, gaming platforms, embedded systems, etc.) and/or a variety of types of applications (e.g., Android.apk files, iOS applications, Windows PE files, Adobe Acrobat PDF files, Microsoft Windows PE installers, etc.). In the example environment shown in FIG. 1, client devices 104-108 are a laptop computer, a desktop computer, and a tablet (respectively) present in an enterprise network 110. Client device 120 is a laptop computer present outside of enterprise network 110.

Data appliance 102 can be configured to work in cooperation with a remote security service 140 (e.g., a cloud-based security service, also referred to as a cloud service or a cloud security service). Security service 140 may be a cloud system such as a cloud service security entity. Security service 140 can provide a variety of services, including performing static and dynamic analysis on malware samples, providing a list of signatures of known exploits (e.g., malicious input strings, malicious files, etc.) to data appliances, such as data appliance 102 as part of a subscription, detecting exploits such as malicious input strings or malicious files (e.g., an on-demand detection, or periodical-based updates to a mapping of input strings or files to indications of whether the input strings or files are malicious or benign), providing a likelihood that an input string or file is malicious or benign, providing/updating a whitelist of input strings or files deemed to be benign, providing/updating input strings or files deemed to be malicious, identifying malicious input strings, detecting malicious input strings, detecting malicious files, predicting whether an input string or file is malicious, and providing an indication that an input string or file is malicious (or benign). In various embodiments, results of analysis (and additional information pertaining to applications, domains, etc.) are stored in database 160. In various embodiments, security service 140 comprises one or more dedicated commercially available hardware servers (e.g., having multi-core processor(s), 32G+ of RAM, gigabit network interface adaptor(s), and hard drive(s)) running typical server-class operating systems (e.g., Linux). Security service 140 can be implemented across a scalable infrastructure comprising multiple such servers, solid state drives, and/or other applicable high-performance hardware. Security service 140 can comprise several distributed components, including components provided by one or more third parties. For example, portions or all of security service 140 can be implemented using the Amazon Elastic Compute Cloud (EC2) and/or Amazon Simple Storage Service (S3). Further, as with data appliance 102, whenever security service 140 is referred to as performing a task, such as storing data or processing data, it is to be understood that a sub-component or multiple sub-components of security service 140 (whether individually or in cooperation with third party components) may cooperate to perform that task. As one example, security service 140 can optionally perform static/dynamic analysis in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security service 140 but may also be provided by a third party. As one example, the virtual machine server can rely on EC2, with the remainder portions of security service 140 provided by dedicated hardware owned by and under the control of the operator of security service 140.

In some embodiments, system 100 (e.g., malicious sample detector 170, security service 140, etc.) trains a detection model to detect exploits (e.g., malicious samples), malicious traffic, and/or other malicious/nefarious/undesirable activity/behavior, etc. Security service 140 may store block lists, allowed lists, etc. with respect to data (e.g., mappings of signatures to malicious files, etc.). In response to processing traffic data, security service 140 may send an update to inline security entities, such as data appliance 102. For example, security service 140 provides an update to a mapping of signatures to malicious files, an update to a mapping of signatures to benign files, etc.

According to various embodiments, the model(s) trained by system 100 (e.g., security service 140) are obtained using a machine learning process (e.g., implementing various machine learning techniques (MLT)). Examples of machine learning processes that can be implemented in connection with training the model(s) include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc. In some embodiments, the system trains an XGBoost machine learning classifier model. As an example, inputs to the classifier (e.g., the XGBoost machine learning classifier model) are a combined feature vector or set of feature vectors and based on the combined feature vector or set of feature vectors the classifier model determines whether the corresponding traffic (e.g., input string) is malicious, or a likelihood that the traffic is malicious (e.g., whether the traffic is exploit traffic).

According to various embodiments, security service 140 includes a malicious sample detector 170. Malicious sample detector 170 is used in connection with determining whether a sample (e.g., traffic data) is malicious. In response to receiving a sample (e.g., an input string such as an input string input in connection with a log-in attempt), malicious sample detector 170 analyzes the sample (e.g., the input string), and determines whether the sample is malicious. For example, malicious sample detector 170 determines one or more feature vectors for the sample (e.g., a combined feature vector), and uses a model to determine (e.g., predict) whether the sample is malicious. Malicious sample detector 170 determines whether the sample is malicious based at least in part on one or more attributes of the sample. In some embodiments, malicious sample detector 170 receives a sample, performs a feature extraction (e.g., a feature extraction with respect to one or more attributes of the input string), and determines (e.g., predicts) whether the sample (e.g., an SQL or command injection string) is malicious based at least in part on the feature extraction results. For example, malicious sample detector 170 uses a classifier (e.g., a detection model) to determine (e.g., predict) whether the sample is malicious based at least in part on the feature extraction results. In some embodiments, the classifier corresponds to a model (e.g., the detection model) to determine whether a sample is malicious, and the model is trained using a machine learning process.

In some embodiments, malicious sample detector 170 comprises one or more of traffic parser 172, prediction engine 174, ML model 176, and/or cache 178.

Traffic parser 172 is used in connection with determining (e.g., isolating) one or more attributes associated with a sample being analyzed. As an example, in the case of a file, traffic parser 172 can parse/extract information from the file, such as from a header of the file. The information obtained from the file may include libraries, functions, or files invoked/called by the file being analyzed, an order of calls, etc. As another example, in the case of an input string, traffic parser 172 determines sets of alphanumeric characters or values associated with the input string. In some embodiments, traffic parser 172 obtains one or more attributes associated with (e.g., from) the input string. For example, traffic parser 172 obtains from the input string one or more patterns (e.g., a pattern of alphanumeric characters), one or more sets of alphanumeric characters, one or more commands, one or more pointers or links, one or more IP addresses, etc.

In some embodiments, one or more feature vectors corresponding to the input string are determined by malicious sample detector 170 (e.g., traffic parser 172 or prediction engine 174). For example, the one or more feature vectors are determined (e.g., populated) based at least in part on the one or more characteristics or attributes associated with the sample (e.g., the one or more attributes or set of alphanumeric characters or values associated with the input string in the case that the sample is an input string). As an example, traffic parser 172 uses the one or more attributes associated with the sample in connection with determining the one or more feature vectors. In some implementations, traffic parser 172 determines a combined feature vector based at least in part on the one or more feature vectors corresponding to the sample. As an example, a set of one or more feature vectors is determined (e.g., set or defined) based at least in part on the model used to detect exploits. Malicious sample detector 170 can use the set of one or more feature vectors to determine the one or more attributes of patterns that are to be used in connection with training or implementing the model (e.g., attributes for which fields are to be populated in the feature vector, etc.). The model may be trained using a set of features that are obtained based at least in part on sample malicious traffic, such as a set of features corresponding to predefined regex statements and/or a set of feature vectors determined based on an algorithmic-based feature extraction. For example, the model is determined based at least in part on performing a malicious feature extraction in connection with generating (e.g., training) a model to detect exploits. The malicious feature extraction can include one or more of (i) using predefined regex statements to obtain specific features from files, or SQL and command injection strings, and (ii) using an algorithmic-based feature extraction to filter out described features from a set of raw input data.

In response to receiving a sample for which malicious sample detector 170 is to determine whether the sample is malicious (or a likelihood that the sample is malicious), malicious sample detector 170 determines the one or more feature vectors (e.g., individual feature vectors corresponding to a set of predefined regex statements, individual feature vectors corresponding to attributes or patterns obtained using an algorithmic-based analysis of exploits, and/or a combined feature vector of both, etc.). As an example, in response to determining (e.g., obtaining) the one or more feature vectors, malicious sample detector 170 (e.g., traffic parser 172) provides (or makes accessible) the one or more feature vectors to prediction engine 174 (e.g., in connection with obtaining a prediction of whether the sample is malicious). As another example, malicious sample detector 170 (e.g., traffic parser 172) stores the one or more feature vectors such as in cache 178 or database 160.

In some embodiments, prediction engine 174 determines whether the sample is malicious based at least in part on one or more of (i) a mapping of samples to indications of whether the corresponding samples are malicious, (ii) a mapping of an identifier for a sample (e.g., a hash or other signature associated with the sample) to indications of whether the corresponding sample is malicious, and/or (iii) a classifier (e.g., a model trained using a machine learning process). In some embodiments, determining whether the sample based on identifiers to indications that the sample is malicious may be performed at data appliance 102, and for a sample for which an associated identifier is not stored in the mapping(s), data appliance 102 offloads processing of the sample to security service 140.

Prediction engine 174 is used to predict whether a sample is malicious. In some embodiments, prediction engine 174 determines (e.g., predicts) whether a received sample is malicious. According to various embodiments, prediction engine 174 determines whether a newly received sample is malicious based at least in part on characteristics/attributes pertaining to the sample (e.g., regex statements, information obtained from a file header, calls to libraries, APIs, etc.). For example, prediction engine 174 applies a machine learning model to determine whether the newly received sample is malicious. Applying the machine learning model to determine whether the sample is malicious may include prediction engine 174 querying machine learning model 176 (e.g., with information pertaining to the sample, one or more feature vectors, etc.). In some implementations, machine learning model 176 is pre-trained and prediction engine 174 does not need to provide a set of training data (e.g., sample malicious traffic and/or sample benign traffic) to machine learning model 176 contemporaneous with a query for an indication/determination of whether a particular sample is malicious. In some embodiments, prediction engine 174 receives information associated with whether the sample is malicious (e.g., an indication that the sample is malicious). For example, prediction engine 174 receives a result of a determination or analysis by machine learning model 176. In some embodiments, prediction engine 174 receives from machine learning model 176 an indication of a likelihood that the sample is malicious. In response to receiving the indication of the likelihood that the sample is malicious, prediction engine 174 determines (e.g., predicts) whether the sample is malicious based at least in part on the likelihood that the sample is malicious. For example, prediction engine 174 compares the likelihood that the sample is malicious to a likelihood threshold value. In response to a determination that the likelihood that the sample is malicious is greater than a likelihood threshold value, prediction engine 174 may deem (e.g., determine that) the sample to be malicious.

According to various embodiments, in response to prediction engine 174 determining that the received sample is malicious, security service 140 sends to a security entity (e.g., data appliance 102) an indication that the sample is malicious. For example, malicious sample detector 170 may send to an inline security entity (e.g., a firewall) or network node (e.g., a client) an indication that the sample is malicious. The indication that the sample is malicious may correspond to an update to a block list of samples (e.g., corresponding to malicious samples) such as in the case that the received sample is deemed to be malicious, or an update to an allowed list of samples (e.g., corresponding to non-malicious samples) such as in the case that the received sample is deemed to be benign. In some embodiments, malicious sample detector 170 sends a hash or signature corresponding to the sample in connection with the indication that the sample is malicious or benign. The security entity or endpoint may compute a hash or signature for a sample and perform a look up against a mapping of hashes/ signatures to indications of whether samples are malicious/ benign (e.g., query an allow list and/or a block list). In some embodiments, the hash or signature uniquely identifies the sample.

Prediction engine 174 is used in connection with determining whether the sample (e.g., an input string) is malicious (e.g., determining a likelihood or prediction of whether the sample is malicious). Prediction engine 174 uses information pertaining to the sample (e.g., one or more attributes, patterns, etc.) in connection with determining whether the corresponding sample is malicious.

In response to receiving a sample to be analyzed, malicious sample detector 170 can determine whether the sample corresponds to a previously analyzed sample (e.g., whether the sample matches a sample associated with historical information for which a maliciousness determination has been previously computed). As an example, malicious sample detector 170 determines whether an identifier or representative information corresponding to the sample is comprised in the historical information (e.g., a block list, an allow list, etc.). In some embodiments, representative information corresponding to the sample is a hash or signature of the sample. In some embodiments, malicious sample detector 170 (e.g., prediction engine 174) determines whether information pertaining to a particular sample is comprised in a dataset of historical input strings and historical information associated with the historical dataset indicating whether a particular sample is malicious (e.g., a third-party service such as VirusTotal™). In response to determining that information pertaining to a particular sample is not comprised in, or available in, the dataset of historical input strings and historical information, malicious sample detector 170 may deem the sample has not yet been analyzed and malicious sample detector 170 can invoke an analysis (e.g., a dynamic analysis) of the sample in connection with determining (e.g., predicting) whether the sample is malicious (e.g., malicious sample detector 170 can query a classifier based on the sample in connection with determining whether the sample is malicious). An example of the historical information associated with the historical samples indicating whether a particular sample is malicious corresponds to a VirusTotal® (VT) score. In the case of a VT score greater than 0 for a particular sample, the particular sample is deemed malicious by the third-party service. In some embodiments, the historical information associated with the historical samples indicating whether a particular sample is malicious corresponds to a social score such as a community-based score or rating (e.g., a reputation score) indicating that a sample is malicious or likely to be malicious. The historical information (e.g., from a third-party service, a community-based score, etc.) indicates whether other vendors or cyber security organizations deem the particular sample to be malicious.

In some embodiments, malicious sample detector 170 (e.g., prediction engine 174) determines that a received sample is newly analyzed (e.g., that the sample is not within the historical information/dataset, is not on an allow list or block list, etc.). Malicious sample detector 170 (e.g., traffic parser 172) may detect that a sample is newly analyzed in response to security service 140 receiving the sample from a security entity (e.g., a firewall) or endpoint within a network. For example, malicious sample detector 170 determines that a sample is newly analyzed contemporaneous with receipt of the sample by security service 140 or malicious sample detector 170. As another example, malicious sample detector 170 (e.g., prediction engine 174) determines that a sample is newly analyzed according to a predefined schedule (e.g., daily, weekly, monthly, etc.), such as in connection with a batch process. In response to determining that a sample is received that has not yet been analyzed with respect to whether such sample is malicious (e.g., the system does not comprise historical information with respect to such input string), malicious sample detector 170 determines whether to use an analysis (e.g., dynamic analysis) of the sample (e.g., to query a classifier to analyze the sample or one or more feature vectors associated with the sample, etc.) in connection with determining whether the sample is malicious, and malicious sample detector 170 uses a classifier with respect to a set of feature vectors or a combined feature vector associated with characteristics or relationships of attributes or characteristics in the sample.

Machine learning model 176 predicts whether a sample (e.g., a newly received sample) is malicious based at least in part on a model. As an example, the model is pre-stored and/or pre-trained. The model can be trained using various machine learning processes. According to various embodiments, machine learning model 176 uses a relationship and/or pattern of attributes and/or characteristics, relationships among attributes or characteristics for the sample, and/or a training set to estimate whether the sample is malicious, such as to predict a likelihood that the sample is malicious. For example, machine learning model 176 uses a machine learning process to analyze a set of relationships between an indication of whether a sample is malicious (or benign), and one or more attributes pertaining to the sample and uses the set of relationships to generate a prediction model for predicting whether a particular sample is malicious. In some embodiments, in response to predicting that a particular sample is malicious, an association between the sample and the indication that the sample is malicious is stored such as at malicious sample detector 170 (e.g., cache 178). In some embodiments, in response to predicting a likelihood that a particular sample is malicious, an association between the sample and the likelihood that the sample is malicious is stored such as at malicious sample detector 170 (e.g., cache 178). Machine learning model 176 may provide the indication of whether a sample is malicious, or a likelihood that the sample is malicious, to prediction engine 174. In some implementations, machine learning model 176 provides prediction engine 174 with an indication that the analysis by machine learning model 176 is complete and that the corresponding result (e.g., the prediction result) is stored in cache 178.

Cache 178 stores information pertaining to a sample (e.g., an input string). In some embodiments, cache 178 stores mappings of indications of whether an input string is malicious (or likely malicious) to particular input strings, or mappings of indications of whether a sample is malicious (or likely malicious) to hashes or signatures corresponding to samples. Cache 178 may store additional information pertaining to a set of samples such as attributes of the samples, hashes or signatures corresponding to a sample in the set of samples, other unique identifiers corresponding to a sample in the set of samples, etc. In some embodiments, inline security entities, such as data appliance 102, store a cache that corresponds to, or is similar to, cache 178. For example, the inline security entities may use the local caches to perform inline processing of traffic data, such as low-latency processing.

Returning to FIG. 1, suppose that a malicious individual (using client device 120) has created malware or malicious input string 130. The malicious individual hopes that a client device, such as client device 104, will execute a copy of malware or other exploit (e.g., malware or malicious input string) 130, compromising the client device, and causing the client device to become a bot in a botnet. The compromised client device can then be instructed to perform tasks (e.g., cryptocurrency mining, or participating in denial-of-service attacks) and/or to report information to an external entity (e.g., associated with such tasks, exfiltrate sensitive corporate data, etc.), such as command and control (C&C) server 150, as well as to receive instructions from C&C server 150, as applicable.

The environment shown in FIG. 1 includes three Domain Name System (DNS) servers (122-126). As shown, DNS server 122 is under the control of ACME (for use by computing assets located within enterprise network 110), while DNS server 124 is publicly accessible (and can also be used by computing assets located within network 110 as well as other devices, such as those located within other networks (e.g., networks 114 and 116)). Enterprise DNS server 122 is configured to resolve enterprise domain names into IP addresses and is further configured to communicate with one or more external DNS servers (e.g., DNS servers 124 and 126) to resolve domain names as applicable.

In order to connect to a legitimate domain (e.g., www.example.com depicted as website 128), a client device, such as client device 104, will need to resolve the domain to a corresponding Internet Protocol (IP) address. One way such resolution can occur is for client device 104 to forward the request to DNS server 122 and/or 124 to resolve the domain. In response to receiving a valid IP address for the requested domain name, client device 104 can connect to website 128 using the IP address. Similarly, in order to connect to malicious C&C server 150, client device 104 will need to resolve the domain, "kj32hkjqfeuo32ylhkjshdflu23.badsite.com," to a corresponding Internet Protocol (IP) address. In this example, malicious DNS server 126 is authoritative for *.badsite.com and client device 104's request will be forwarded (for example) to DNS server 126 to resolve, ultimately allowing C&C server 150 to receive data from client device 104.

Data appliance 102 is configured to enforce policies regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, information input to a web interface such as a login screen, files exchanged through instant messaging programs, and/or other file transfers, and/or quarantining or deleting files or other exploits identified as being malicious (or likely malicious). In some embodiments, data appliance 102 is also configured to enforce policies with respect to traffic that stays within enterprise network 110. In some embodiments, a security policy includes an indication that network traffic (e.g., all network traffic, a particular type of network traffic, etc.) is to be classified/scanned by a classifier stored in local cache or otherwise that certain detected network traffic is to be further analyzed (e.g., using a finer detection model) such as by offloading processing to security service 140.

In various embodiments, data appliance 102 includes signatures 134 (e.g., periodically updated from security service 140) and an inline machine learning antivirus (MLAV) module 135, which is configured to facilitate ML-based malware detection (e.g., the MLAV model component can be implemented as further described in U.S. Pat. Nos. 11,374,946 and 11,636,208, which are both incorporated herein by reference in their entirety). Using processing described in more detail below, security service 140 will determine (e.g., using a malicious file detector that may be similar to malicious sample detector 170 such as by using a machine learning model to detect/predict whether the file is malicious) whether a sample (e.g., a file) is a malicious file (or likely to be a malicious file) and provide a result back to data appliance 102 (e.g., "malicious file" or "benign file").

In some embodiments, malicious sample detector 170 provides to a security entity, such as data appliance 102, an indication whether a sample is malicious. For example, in response to determining that the sample is malicious, malicious sample detector 170 sends an indication that the sample is malicious to data appliance 102, and the data appliance may in turn enforce one or more security policies based at least in part on the indication that the sample is malicious. The one or more security policies may include isolating/quarantining the input string or file, deleting the sample, ensuring that the sample is not executed or resolved, alerting or prompting the user of the maliciousness of the sample prior to the user opening/executing the sample, etc. As another example, in response to determining that the sample is malicious, malicious sample detector 170 provides to the security entity an update of a mapping of samples (or hashes, signatures, or other unique identifiers corresponding to samples) to indications of whether a corresponding sample is malicious, or an update to a blacklist for malicious samples (e.g., identifying samples) or a whitelist for benign samples (e.g., identifying samples that are not deemed malicious).

Figure 2A:
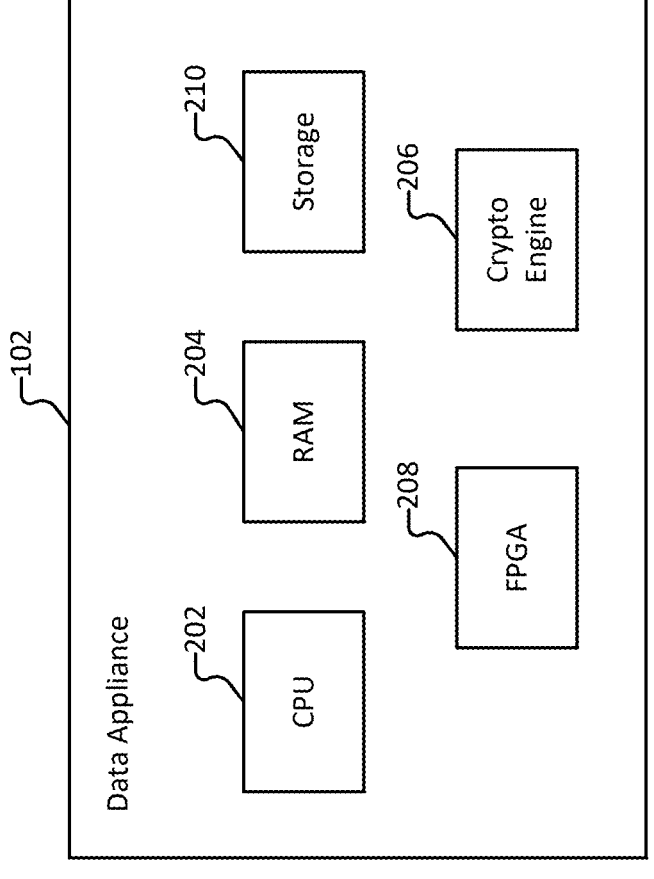
FIG. 2A illustrates an embodiment of a data appliance.

FIG. 2A illustrates an embodiment of a data appliance. An embodiment of an inline security entity, such as data appliance 102, is shown in FIG. 2A. The example shown is a representation of physical components that are included in data appliance 102, in various embodiments. Specifically, data appliance 102 includes a high-performance multi-core Central Processing Unit (CPU) 202 and Random Access Memory (RAM) 204. Data appliance 102 also includes a storage 210 (such as one or more hard disks or solid-state storage units). In various embodiments, data appliance 102 stores (whether in RAM 204, storage 210, and/or other appropriate locations) information used in monitoring enterprise network 110 and implementing disclosed techniques. Examples of such information include application identifiers, content identifiers, user identifiers, requested URLs, IP address mappings, policy and other configuration information, signatures, hostname/URL categorization information, malware profiles, and machine learning models. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general-purpose computer, a computer server, a gateway, and/or a network/routing device. In some embodiments, at least some services described as being provided by data appliance 102 are instead (or in addition) provided to a client device (e.g., client device 104 or client device 106) by software executing on the client device.

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing-Social Networking; Web Browsing-News; SSH; and so on.

Figure 2B:
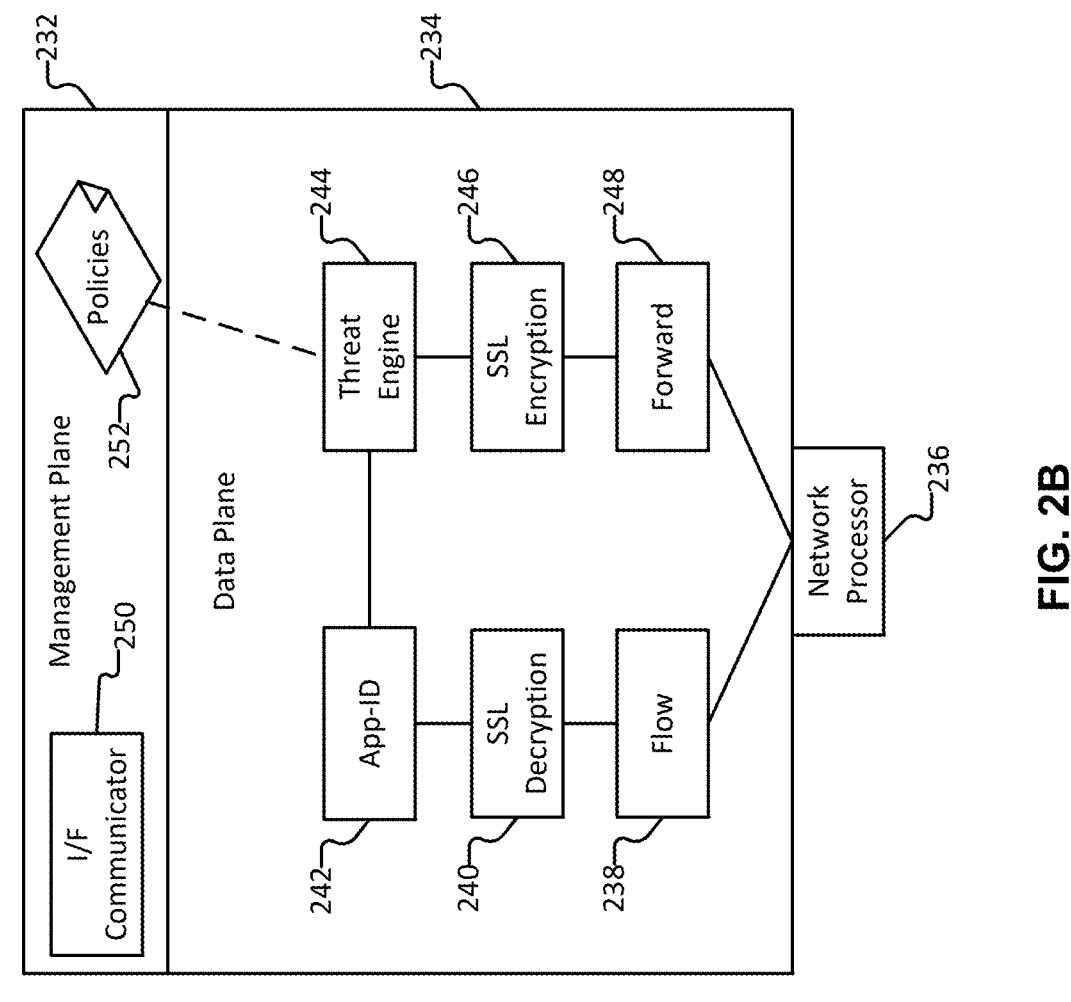
FIG. 2B is a functional diagram of logical components of an embodiment of a data appliance.

FIG. 2B is a functional diagram of logical components of an embodiment of a data appliance. The example shown is a representation of logical components that can be included in an inline security appliance, such as data appliance 102, in various embodiments. Unless otherwise specified, various logical components of data appliance 102 are generally implementable in a variety of ways, including as a set of one or more scripts (e.g., written in Go, Java, Python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling. The data plane may be further responsible for offloading processing to a cloud system/service, such as by communicating a request message to the cloud system/service without mediation or forwarding the message through the management plane, such as further described herein.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 110. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, such as a web browsing session, the identified application can change, and such changes will be noted by data appliance 102. For example, a user may initially browse to a corporate Wiki (classified based on the URL visited as "Web Browsing—Productivity") and then subsequently browse to a social networking site (classified based on the URL visited as "Web Browsing—Social Networking"). Different types of protocols have corresponding decoders.

Based on the determination made by application identification engine 242, the packets are sent, by threat engine 244, to an appropriate decoder configured to assemble packets (which may be received out of order) into the correct order, perform tokenization, and extract out information. Threat engine 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 250 is provided for management communications (e.g., via (REST) APIs, messages, or network protocol communications or other communication mechanisms).

Enhanced Internal Host Detection Protocol

The disclosed techniques for an enhanced internal host detection protocol can solve technical challenges associated with user authentication to cloud security services as similarly discussed above. For example, the Prisma Access cloud security service allows customers to authenticate their user accounts using the endpoint agents executing on their host (e.g., GP client software executing on user endpoint devices, such as their laptop, smart phone, desktop computer, etc.) to create user IDs for various security policy enforcement decisions (e.g., security policy rules that can be configured based on user IDs).

When a user is attempting access from a public network, the endpoint agent (e.g., GP client executing on the user's endpoint device/host) establishes a VPN tunnel with a GP gateway to enter the cloud security service protected enterprise network (e.g., Prisma Access protected enterprise network).

When a given host with the endpoint agent is already in the enterprise network, there is not an absolute need of such GP protection. However, many customers desire extra security for their users/devices. As such, the endpoint agents can also authenticate with IGWs that are also from the enterprise network, which facilitates the enhanced security as the hosts are assigned a user ID and various security policies/rules can be configured based on user ID attributes to provide for such enhanced user/device security (e.g., which is similar to as if the user/device was on a public network as opposed to accessing from the enterprise network).

While IGWs are widely deployed by many large enterprise customers of the cloud security service, cloud native support of IGWs is desired by many customers for reasons similarly discussed above (e.g., it is expensive to configure, deploy, and maintain such IGWs for enterprises).

Figure 3:
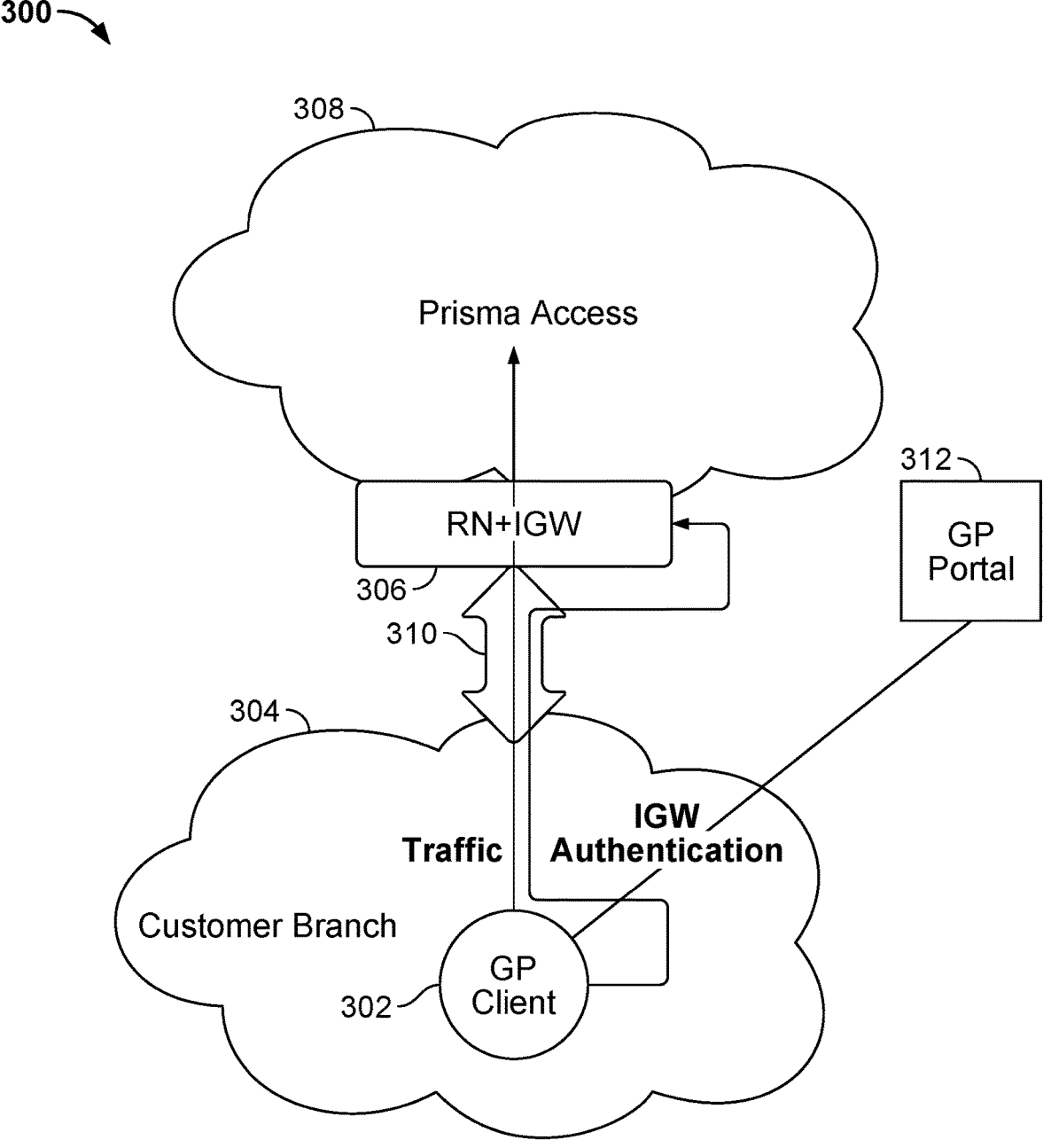
FIG. 3 illustrates a high-level architecture for an enhanced internal host detection protocol for authentication to a cloud security service in accordance with some embodiments.

Thus, the disclosed techniques for an enhanced internal host detection protocol can facilitate such a cloud native IGW solution as will now be further described with respect to FIG. 3.

FIG. 3 illustrates a high-level architecture for an enhanced internal host detection protocol for authentication to a cloud security service in accordance with some embodiments. As shown at 300, a high-level architecture for an enhanced internal host detection protocol for authentication of an endpoint agent 302 (e.g., a GP Client or another endpoint agent can similarly be configured to utilize the disclosed techniques) on a customer branch network 304 to a cloud security service 308 (e.g., Prisma Access or another cloud security service can similarly be configured to utilize the disclosed techniques) is provided as will now be further described below.

Referring to FIG. 3, remote networks (RNs), such as RN 306, serve as entry points for customer networks, such as customer branch network 304, to the cloud security service, such as Prisma Access 308. In this example implementation, RN and internal gateway (IGW) 306 connects customer networks with secure tunnels (e.g., an IPSEC tunnel for each RN), such as shown at 310. The endpoint agent communicates with a portal for the cloud security service 312 (e.g., a GP Portal or another cloud security portal can similarly be configured to utilize the disclosed techniques) in order to verify that it is located in the customer branch network 304 (e.g., using a DNS reverse lookup mechanism as will be further described below), and if the verification is successful, then the cloud security portal returns the fully qualified domain name (FQDN) (e.g., a.com) in response to the endpoint agent's get configuration (getconfig) query for a given IP address (e.g., 1.2.3.4) to inform the endpoint agent that its cloud security service is hosted on that FQDN (e.g., a.com).

In an example implementation, in the portal getconfig response, there is a pair of an FQDN and an IPv4 address, or an FQDN and an IPv6 address, or both. The portal getconfig response also includes a list of the internal gateways (IGWs). In some implementations, the FQDNs and/or the IPs in the IHD do not have to appear in the internal gateway (IGW) list (e.g., as IHD is currently independent with the internal gateways, they are just used in this example implementation for the safe word exchange).

The endpoint agent will then perform a DNS reverse lookup directed to a preconfigured Anycast IP address associated with the enterprise customer, and that reverse DNS query is automatically routed through the IPSEC tunnel to the RN that hosts a DNS Proxy associated with that Anycast IP address (e.g., and the RN can determine that such is a trusted reverse DNS lookup query from an endpoint agent that is verified to be in a trusted customer branch network as such was successfully routed to the RN via the IPSEC tunnel connected with the customer branch network). The DNS Proxy then similarly returns the FQDN (e.g., a.com). As such, the endpoint agent can then verify that the response (e.g., answer to the DNS reverse lookup query) from the DNS reverse lookup is not spoofed as it matches the FQDN returned from the portal as described above.

The endpoint agent can then safely establish a connection/session with the cloud security service with the IGW of the RN and establish a User ID with the cloud security service to facilitate security enforcement based on the associated User ID at the IGW (306). This solution facilitates an authentication mechanism that is efficient for customers to deploy and is secure as it ensures that there is no spoofing and that the endpoint agent can safely connect with the IGW hosted on the RN, such as will be further described below.

A unique private IP address is assigned to the tunnel interface on the RN (e.g., each IPSEC tunnel interface for each RN). However, this can result in having too many private IP addresses to manage.

As such, the disclosed techniques include exposing the same anycast IP as the DNS proxy address. Generally, Anycast refers to a and IGW network addressing and routing methodology in which a single destination IP address can be shared by devices (e.g., servers) in distinct locations. Routers direct packets addressed to this destination to the location nearest the sender, using their normal decision-making algorithms, typically the lowest number of BGP network hops. Anycast routing is widely used by content delivery networks such as web and DNS hosts, to bring their content closer to end users. As being utilized in the context of the disclosed enhanced internal host detection protocol, Anycast network addressing is being uniquely applied to facilitate an effective and efficient mechanism for routing endpoint agents for each given customer (e.g., unique Anycast IP addresses are allocated per customer in this example implementation) to the closest RN and IGW for accessing the cloud security service as will now be further described below.

Thus, GP client 302 from customer branch network 304 establishes a new connection (e.g., a new session) through RN and IGW 306 in front of the branch network to enter the Prisma Access domain 308. And as a result, it will not reach other RNs or other IGWs before entering the Prisma Access domain.

Specifically, when RN and IGW 306 determines the destination IP as the above-mentioned Anycast IP address for the given customer, it is configured to terminate the session with itself.

Accordingly, as will be further described below, the disclosed techniques facilitate an enhanced internal host detection protocol for authentication to a cloud security service that significantly reduces the complexity associated with the service IP address management issues that can arise as similarly discussed above.

In this example implementation, RN and IGW 306 is also performing a security enforcer role such that the RN needs to have User IDs for each of the sessions initiated from and only from the on premises networks (e.g., enterprise customer branch networks, such as shown at 306).

FIG. 4A illustrates an example of a getconfig request from an endpoint agent in accordance with some embodiments. In this example implementation, the getconfig request is an HTTP request.

FIG. 4B illustrates a typical response from the cloud security service portal to the getconfig request sent from the endpoint agent in accordance with some embodiments.

As such, in this example implementation, the disclosed enhanced internal host detection protocol process is similar to a safe word exchange between the endpoint agent (e.g., as shown at 302 in FIG. 3) and the cloud security service portal (e.g., as shown at 312 in FIG. 3). Specifically, the disclosed safe word exchange performed via a DNS reverse lookup mechanism can be used to effectively and efficiently verify that the request is emanating from an endpoint agent that resides in a trusted enterprise branch network. More specifically, the enterprise customer specifies a pair of an IP address and a fully qualified domain name (FQDN) in the configuration (e.g., using the Panorama management interface that is commercially available from Palo Alto Networks, Inc., headquartered in Santa Clara, CA, or another management interface can similarly be used for such configuration settings input). The endpoint agent (e.g., GP client) uses the IP address to perform a DNS reverse lookup. If the returned FQDN is the same as the one in the configuration, then the endpoint agent can assume that it is in the internal enterprise network, and it will log in to the IGWs instead of the GPGWs.

As such, for customers that elect to use their own DNS servers for this DNS reverse lookup, such customers would configure the pairs of the safe words as described above. Such customers would also be required then to host their own DNS server in their enterprise network, and add the PTR records for the internal host detection in the DNS server database.

An alternative solution for providing the PTR records for DNS reverse lookup queries will now be described. Specifically, for customers that elect to use the cloud security service's DNS Proxy solution, then static DNS entries can be configured in the RN DNS Proxy (e.g., the RN DNS Proxy can be included as a component in RN and IGW shown at 306 of FIG. 3). Based on the PanOS DNS static entry implementation, when an A/AAAA record is configured, the PTR record for the configured record is automatically generated. As such, customers that elect to utilize the RN DNS Proxy are not required to configure the safe words and maintain such in their own on premises DNS server as such DNS reverse lookup queries are routed through cloud security service's DNS Proxies.

In this alternative implementation, in order to ensure that the PTR records do not conflict with records from other servers, the cloud security service can reserve an Anycast IPv4/6 to host the IGW on the RNs (e.g., on most of the RN instances for such infrastructure/service subnet reservations in IPv4 or IPv6, in which unique Anycast IP addresses are allocated per customer). The Anycast IP address is guaranteed to be unique per customer, otherwise the cloud security service cannot be provided. As such, the PTR record is configured to be the Anycast IP address mapped to an FQDN that is assigned to it. The IGW service can then be hosted on the Anycast IP address to facilitate the disclosed enhanced internal host detection protocol to facilitate authentication to the cloud security service.

Accordingly, using the disclosed enhanced internal host detection protocol, the cloud security service provides for an efficient and secure solution for users attempting to authenticate to the cloud security service without requiring additional IGW or DNS server configurations by the enterprise customers.

As an example, for a large enterprise customer that deploys many servers around the world, each can be associated with a distinct FQDN. Using the disclosed enhanced internal host detection protocol, the client performs a DNS reverse lookup with a given IP, and the system will return an FQDN to tell the client where to send the message to.

Neither the IP nor the FQDN needs to point to a host which really exists. We can even use different IP addresses to represent different purposes of the query, and return a human readable message as the FQDN.

Moreover, using this integrated IGW solution, the RNs do not need to redistribute User IDs from other security platforms (e.g., NGFWs) for security enforcement.

Additional example processes for the disclosed techniques for an enhanced internal host detection protocol will now be disclosed.

Process Embodiments for an Enhanced Internal Host Detection Protocol

FIG. 5 is a flow diagram of a process for an enhanced internal host detection protocol in accordance with some embodiments. In some embodiments, a process 500 as shown in FIG. 5 is performed by an endpoint agent, DNS proxy, and an internal gateway hosted on a remote network associated with a cloud security service and techniques as similarly described above including the embodiments described above with respect to FIGS. 3-4B.

At 502, a response to a get configuration (getconfig) query is sent from a portal for a cloud security service to an endpoint agent, such as similarly described above with respect to FIG. 3.

In an example implementation, in the portal getconfig response, there is a pair of an FQDN and an IPv4 address, or an FQDN and an IPv6 address, or both. The portal getconfig response also includes a list of the internal gateways (IGWs). In some implementations, the FQDNs and/or the IPs in the IHD do not have to appear in the internal gateway (IGW) list (e.g., as IHD is currently independent with the internal gateways, they are just used in this example implementation for the safe word exchange).

At 504, a DNS reverse lookup query is routed to a predetermined IP address associated with a DNS proxy associated with the cloud security service, such as similarly described above with respect to FIG. 3.

At 506, a response to the DNS reverse lookup query is sent from the DNS proxy associated with the cloud security service, such as similarly described above with respect to FIG. 3.

At 508, verifying that the response to the DNS reverse lookup query is not spoofed based on a match with the first response is performed, such as similarly described above with respect to FIG. 3.

Figure 6:
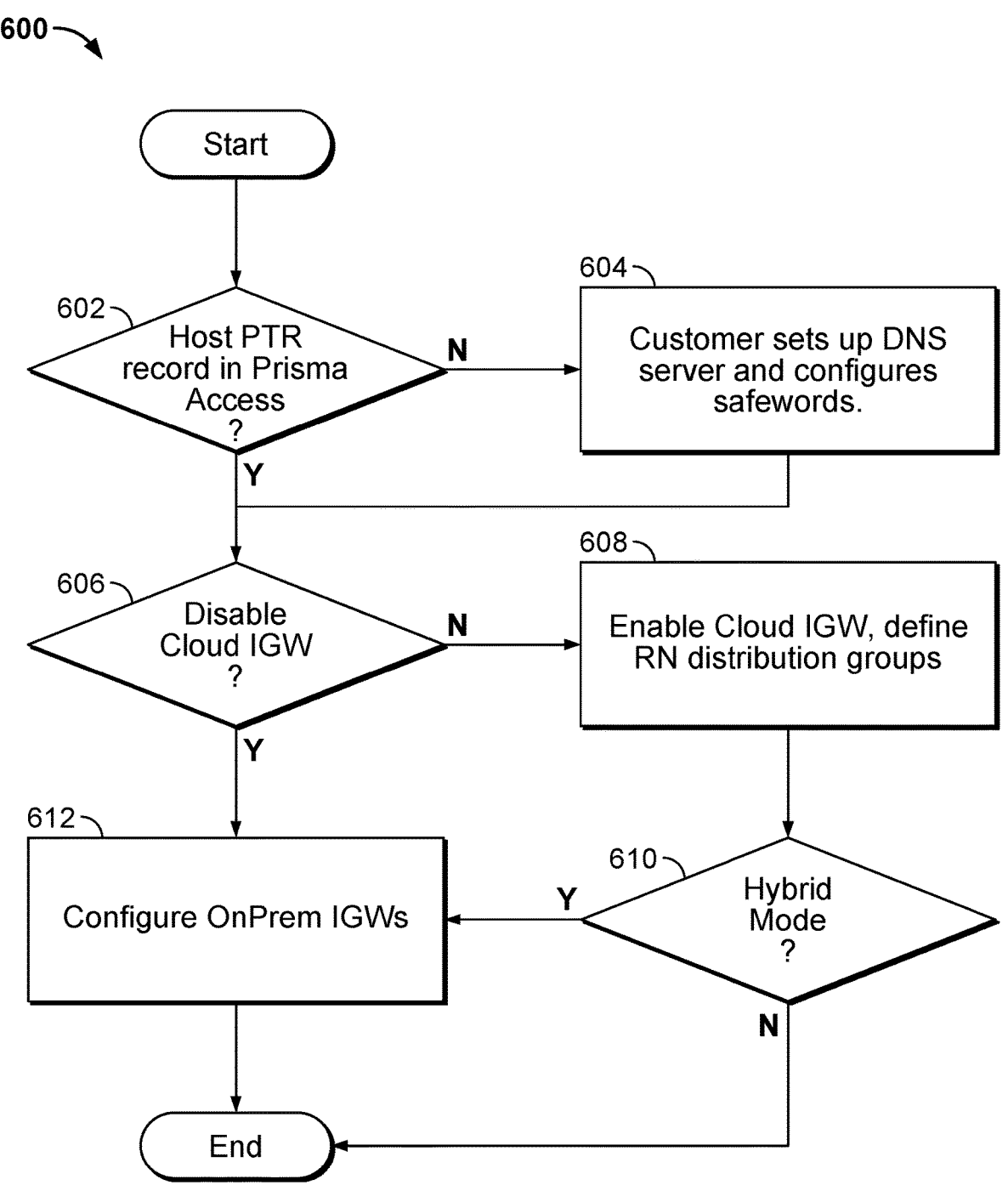
FIG. 6 is a flow diagram of a process for configuring a cloud security service using an enhanced internal host detection protocol in accordance with some embodiments.

FIG. 6 is a flow diagram of a process for configuring a cloud security service using an enhanced internal host detection protocol in accordance with some embodiments. In some embodiments, a process 600 as shown in FIG. 6 is performed by an endpoint agent, DNS proxy, and an internal gateway hosted on a remote network associated with a cloud security service and techniques as similarly described above including the embodiments described above with respect to FIGS. 3-4B.

At 602, it is determined whether there is a Host PTR record in Prisma Access.

At 604, if not, then the customer sets up a DNS server and configures safe words.

At 606, if so, then it is determined whether to disable the cloud IGW.

At 608, if not, then the cloud IGW is enabled and the RN distribution groups are defined.

At 610, it is determined whether to configure the deployment for access to the cloud security service in a hybrid mode (e.g., allowing for use of on premises IGWs as well as a cloud IGW). If not, then the process is completed. Otherwise, the process proceeds to stage 612.

At 612, configuring the on premises IGWs is performed.

Figure 7:
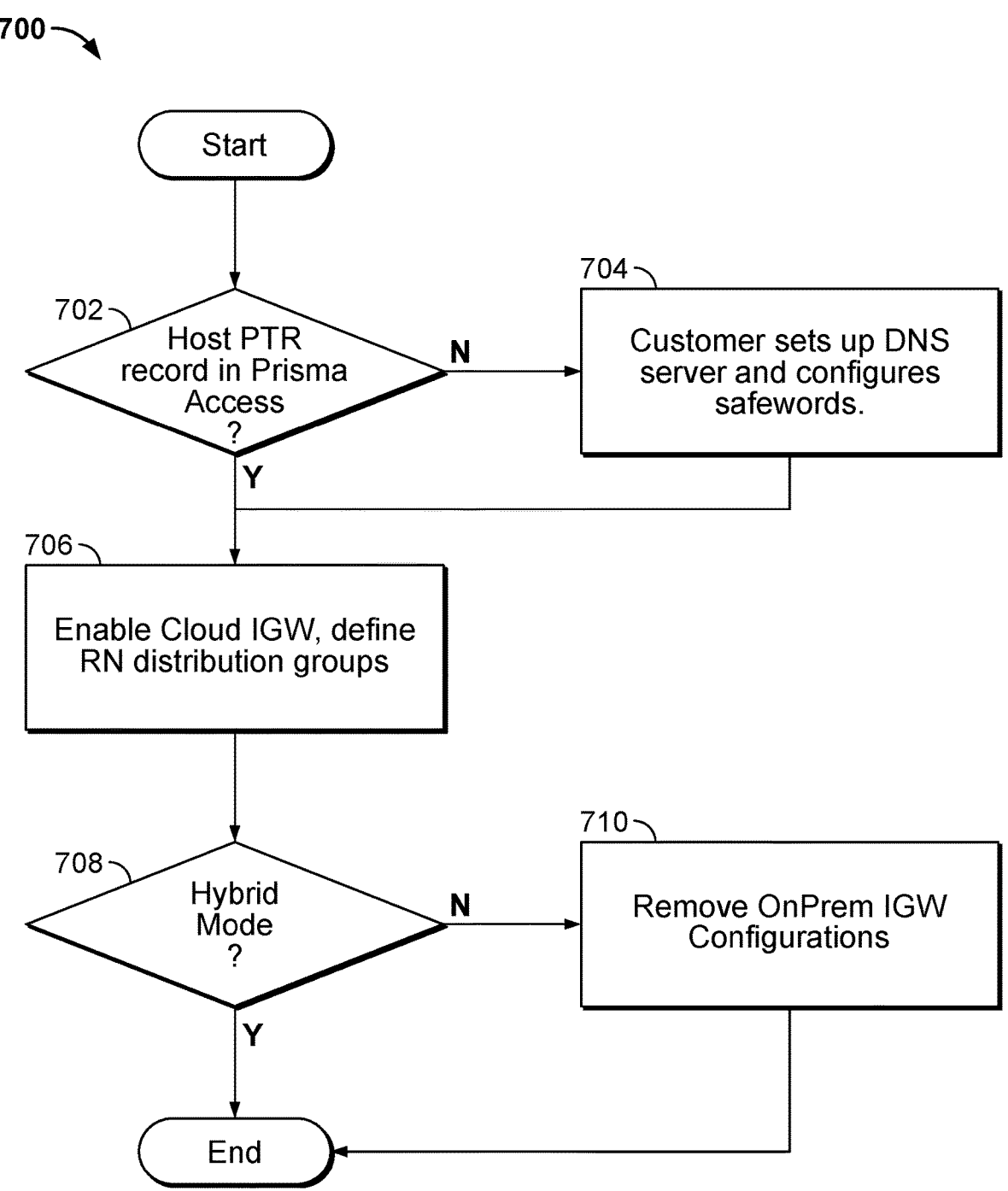
FIG. 7 is another flow diagram of a process for configuring a cloud security service using an enhanced internal host detection protocol in accordance with some embodiments.

FIG. 7 is another flow diagram of a process for configuring a cloud security service using an enhanced internal host detection protocol in accordance with some embodiments. In some embodiments, a process 700 as shown in FIG. 7 is performed by an endpoint agent, DNS proxy, and an internal gateway hosted on a remote network associated with a cloud security service and techniques as similarly described above including the embodiments described above with respect to FIGS. 3-4B.

At 702, it is determined whether there is a Host PTR record in Prisma Access.

At 704, if not, then the customer sets up a DNS server and configures safe words.

At 706, if so, the cloud IGW is enabled and the RN distribution groups are defined.

At 708, it is determined whether to configure the deployment for access to the cloud security service in a hybrid mode (e.g., allowing for use of on premises IGWs as well as a cloud IGW). If yes, then the process is completed. Otherwise, the process proceeds to stage 710.

At 710, the on premises IGW configurations are removed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

a processor configured to:

send a response to a get configuration query from a portal for a cloud security service to an endpoint agent;

route a DNS reverse lookup query to a predetermined IP address associated with a DNS proxy associated with the cloud security service, wherein the routing of the DNS reverse lookup query comprises to route the DNS reverse lookup query via an Internet Protocol Security (IPSEC) tunnel to a remote network (RN) that hosts the DNS proxy associated with the predetermined IP address, wherein the predetermined IP address associated with the DNS proxy associated with the cloud security service is an Anycast IP address, wherein an internal gateway is hosted on a remote network associated with the cloud security service;

send a response to the DNS reverse lookup query from the DNS proxy associated with the cloud security service, wherein the response includes one or more of the following: 1) A first FQDN and an IPV4 address, and/or 2) a first FQDN and an IPV6 address, and wherein the response to the DNS reverse lookup query includes a second FDQN; and verify that the response to the DNS reverse lookup query is not spoofed based on a match with the response to the get configuration query, comprising to:

determine that the first FDQN matches the second FDQN; and in response to a determination that the first FDQN and the second FDQN match, determine that the response to the DNS reverse lookup query is not spoofed; and a memory coupled to the processor and configured to provide the processor with instructions.

2. The system of claim 1, wherein the DNS proxy is hosted on a remote network associated with the cloud security service.

3. The system of claim 1, wherein a second DNS reverse lookup query is automatically routed through a secure tunnel that connects a branch office network to a remote network associated with the cloud security service.

4. The system of claim 1, wherein the processor is further configured to:

establish a secure connection with an internal gateway of a remote network associated with the cloud security service.

5. The system of claim 1, wherein the processor is further configured to:

establish a secure connection with an internal gateway of a remote network associated with the cloud security service, wherein the internal gateway is hosted on the remote network associated with the cloud security service.

6. A method, comprising:

sending a response to a get configuration query from a portal for a cloud security service to an endpoint agent;

routing a DNS reverse lookup query to a predetermined IP address associated with a DNS proxy associated with the cloud security service, wherein the routing of the DNS reverse lookup query comprises to route the DNS reverse lookup query via an Internet Protocol Security (IPSEC) tunnel to a remote network (RN) that hosts the DNS proxy associated with the predetermined IP address, wherein the predetermined IP address associated with the DNS proxy associated with the cloud security service is an Anycast IP address, wherein an internal gateway is hosted on a remote network associated with the cloud security service;

sending a response to the DNS reverse lookup query from the DNS proxy associated with the cloud security service, wherein the response includes one or more of the following: 1) a first FQDN and an IPV4 address, and/or 2) a first FQDN and an IPV6 address, and wherein the response to the DNS reverse lookup query includes a second FDQN; and verifying that the response to the DNS reverse lookup query is not spoofed based on a match with the response to the get configuration query, comprising:

determining that the first FDQN matches the second FDQN; and in response to a determination that the first FDQN and the second FDQN match, determining that the response to the DNS reverse lookup query is not spoofed.

7. The method of claim 6, wherein the DNS proxy is hosted on a remote network associated with the cloud security service.

8. The method of claim 6, wherein a second DNS reverse lookup query is automatically routed through a secure tunnel that connects a branch office network to a remote network associated with the cloud security service.

9. The method of claim 6, further comprising:

establishing a secure connection with an internal gateway of a remote network associated with the cloud security service.

10. The method of claim 6, further comprising:

establishing a secure connection with an internal gateway of a remote network associated with the cloud security service, wherein the internal gateway is hosted on the remote network associated with the cloud security service.

11. A computer program product embodied in a non-transitory computer readable medium and comprising computer instructions for:

sending a response to a get configuration query from a portal for a cloud security service to an endpoint agent;

routing a DNS reverse lookup query to a predetermined IP address associated with a DNS proxy associated with the cloud security service, wherein the routing of the DNS reverse lookup query comprises to route the DNS reverse lookup query via an Internet Protocol Security (IPSEC) tunnel to a remote network (RN) that hosts the DNS proxy associated with the predetermined IP address, wherein the predetermined IP address associated with the DNS proxy associated with the cloud security service is an Anycast IP address, wherein an internal gateway is hosted on a remote network associated with the cloud security service;

sending a response to the DNS reverse lookup query from the DNS proxy associated with the cloud security service, wherein the response includes one or more of the following: 1) a first FQDN and an IPV4 address, and/or 2) a first FQDN and an IPV6 address, and wherein the response to the DNS reverse lookup query includes a second FDQN; and verifying that the response to the DNS reverse lookup query is not spoofed based on a match with the response to the get configuration query, comprising:

determining that the first FDQN matches the second FDQN; and in response to a determination that the first FDQN and the second FDQN match, determining that the response to the DNS reverse lookup query is not spoofed.

12. The computer program product of claim 11, wherein the DNS proxy is hosted on a remote network associated with the cloud security service.

13. The computer program product of claim 11, wherein a second DNS reverse lookup query is automatically routed through a secure tunnel that connects a branch office network to a remote network associated with the cloud security service.

14. The computer program product of claim 11, further comprising computer instructions for:

establishing a secure connection with an internal gateway of a remote network associated with the cloud security service.

* * * * *